May 2, 1967 H. FRIEDMAN ETAL 3,316,811
METHOD AND APPARATUS FOR FORMING SHOULDER PADS
Filed June 8, 1964 2 Sheets-Sheet 1

INVENTORS.
HOWARD FRIEDMAN
JACK FRIEDMAN
BY Leonard H. King
ATTORNEY.

INVENTORS.
HOWARD FRIEDMAN
BY JACK FRIEDMAN

Leonard H. King
ATTORNEY

United States Patent Office 3,316,811
Patented May 2, 1967

3,316,811
METHOD AND APPARATUS FOR FORMING
SHOULDER PADS
Howard Friedman, Crawford Road, Harrison, N.Y.
10528; and Jack Friedman, 1350 Huckleberry Lane,
Hewlett Harbor, N.Y. 11557
Filed June 8, 1964, Ser. No. 373,149
18 Claims. (Cl. 90—11)

This invention relates to the manufacture of foamed plastic shoulder pads for articles of wearing apparel and more particularly to the method and apparatus for automatically and sequentially machining a shoulder pad having concave surfaces, a convex surface and notches.

The machine tool prior art is replete with many examples of equipment designed to form concave surfaces, convex surfaces and for cutting notches. The variously shaped blades of a woodworking molder may do this in single steps or may do it automatically and sequentially.

However, the prior art, of which the woodworking tools mentioned are merely examples, are primarily devoted to fabricating articles from a solid or rigid raw material. As will be described more fully hereinafter, the instant application is directed to a method and apparatus for the sequential and automatic machining of nonrigid, highly porous polyurethane bar stock. This particular material has properties uncommon with a solid raw material and therefore presents manufacturing problems of an entirely different nature.

The polyurethane shoulder pad formed by the method and apparatus of the present invention is substantially wedge-shaped in a vertical, transverse cross section. However, all three major surfaces of the wedge are arcuate, a first surface being concave in the horizontal plane. The two remaining surfaces, one in the vertical plane and the other at some small angle thereto, are concave and convex, respectively, in their particular planes.

The various arcuate or nonplanar surfaces are sequentially machined at a high rate of speed and in addition, locating notches are cut into the top surface and the bottom edge of the wedge-shaped shoulder pad. The thickness of the wedge is greatest at the midpoint of the top surface and gradually diminishes to feather edges on both vertical sides and on the bottom.

Apparatus for forming the aforementioned shoulder pad is comprised, in part, of a cutting tool that is alternately tilted off of the vertical plane to produce the angular surface of the wedge and pivoted in a plane transverse the linear path of the bar stock to produce one concave and one convex surface in the vertical plane. Another cutting tool, preferably driven from a common source, forms the concave horizontal or top surface of the wedge.

Drive rollers disposed on either side of the 4-inch by 4-inch foamed polyurethane bar stock advance the workpiece past the machining stations. As the bar stock advances, it passes between a pair of opposed upper and lower rotary cutting wheels which cut continuous, longitudinal notches parallel to the bar stock path. Suitable means are provided so that the cutting wheels, as well as the drive rollers, may be driven from the single power source.

Thus a single continuous machine accomplishes several diverse operations. This is essential since the shoulder pads must be produced economically and sold at a low price if the finished garment, of which the pads are a component, is to be priced competitively. The method and apparatus of the present invention, described hereinbefore in general terms, is capable of fabricating 50,000 pairs of shoulder pads a day. By way of contrast, prior art equipment required a separate die-cutting operation to form the concave surface at the top of the wedge and it was possible to produce only 5,000 pairs of shoulder pads a day. Consequently, the shoulder pads produced by the prior art were somewhat more expensive, since additional handling was required and the production per man hour was considerably less than with the instant invention.

Accordingly, it is an object of the present invention to provide a single machine that will sequentially perform all the operations required to produce a multiplanar, polyurethane shoulder pad.

Another object is to provide a method of fabricating polyurethane shoulder pads that does not require additional handling of each shoulder pad for different machining operations.

A further object is to provide a high speed, automatic machine that will produce a multiplanar polyurethane shoulder pad at a lower cost than similar prior art devices.

An additional object is to provide a polyurethane shoulder pad having a plurality of nonplanar surfaces and a pair of upper and lower locating notches to facilitate assembly of the pad into an article of wearing apparel.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing, like reference characters designate like parts.

Figure 6:
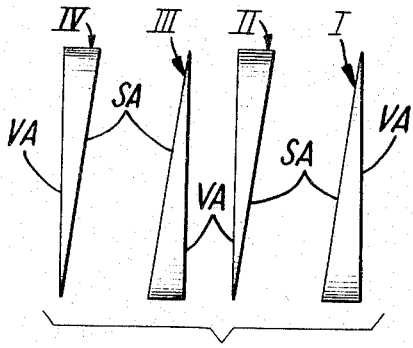
Figure 7:
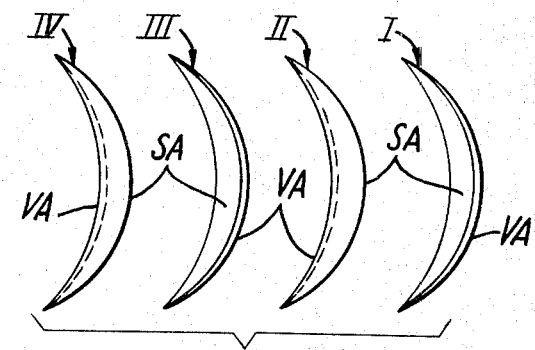
Figure 8:
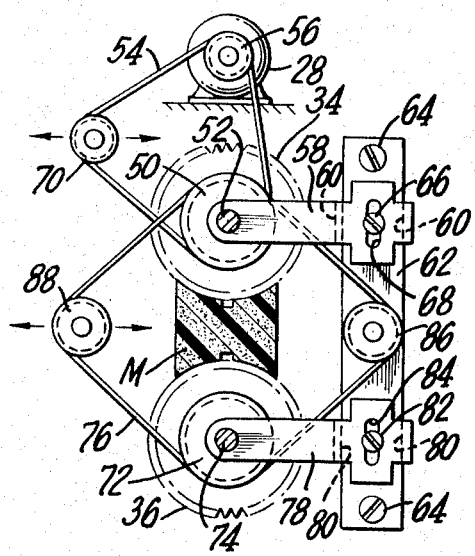
Figure 9:
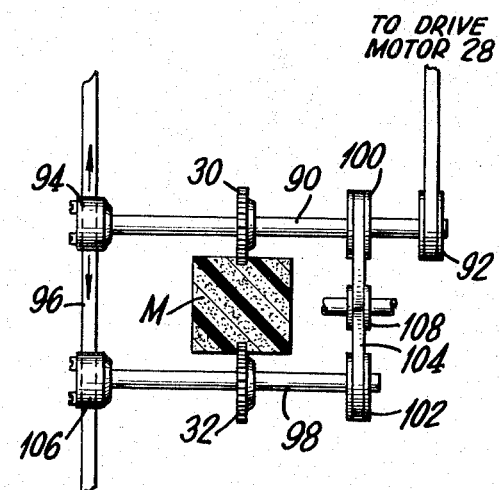

FIG. 6 schematically illustrates in a single plane outline several consecutive shoulder pads after fabrication by means of the present invention;

FIG. 7 is a plan view of the FIG. 6 schematic representation;

FIG. 8 is a sectional elevation view schematically illustrating adjustment means for the shaping tools employed with the present invention; and FIG. 9 is another sectional elevational view schematically illustrating the upper and lower notching wheels and the adjustment means therefor.

Figure 10:
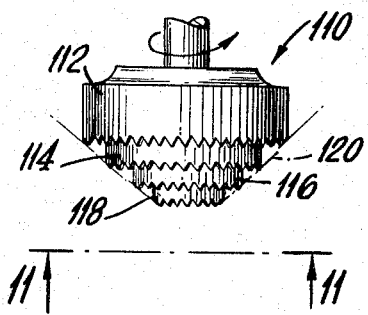
Figure 11:
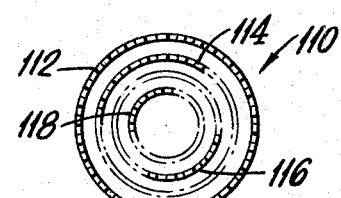

FIG. 10 illustrates an alternative shaping tool that may be utilized with the instant invention; and FIG. 11 is an underside view of the alternative shaping tool taken along line 11—11 of FIG. 10.

Figure 1:
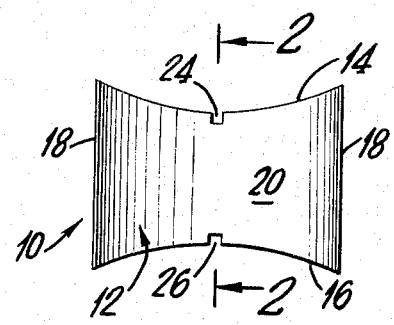
FIG. 1 is a front elevational view of a shoulder pad fabricated in accordance with the method and by the apparatus of the present invention.
Figure 2:
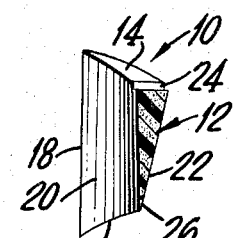
FIG. 2 is a sectional elevation view through the center of the shoulder pad in a vertical plane along the line 2—2.
Figure 3:
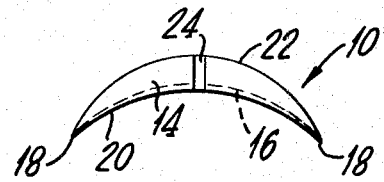
FIG. 3 is a plan view of a fully machined shoulder pad.

Referring now to the drawing, FIG. 1, FIG. 2 and FIG. 3 illustrate a completed shoulder pad 10 machined from a 4-inch by 4-inch bar of foamed polyurethane in accordance with the method and by the apparatus of the present invention. Wedge-shaped body portion 12 has a concave top surface 14 and a relatively thin, horizontal bottom edge 16. From the center of the pad, body portion 12 gradually thins out to substantially parallel, vertical knife edges 18. Front and rear surfaces 20 and 22 of the body portion are concave and convex, respectively. Notches 24 and 26 are cut into top surface 14 and bottom edge 16, respectively. FIG. 2 particularly illustrates the wedgelike cross section of the pad where it will be seen tha the body portion is thickest at the top surface and thinnest at the bottom edge.

Figure 4:
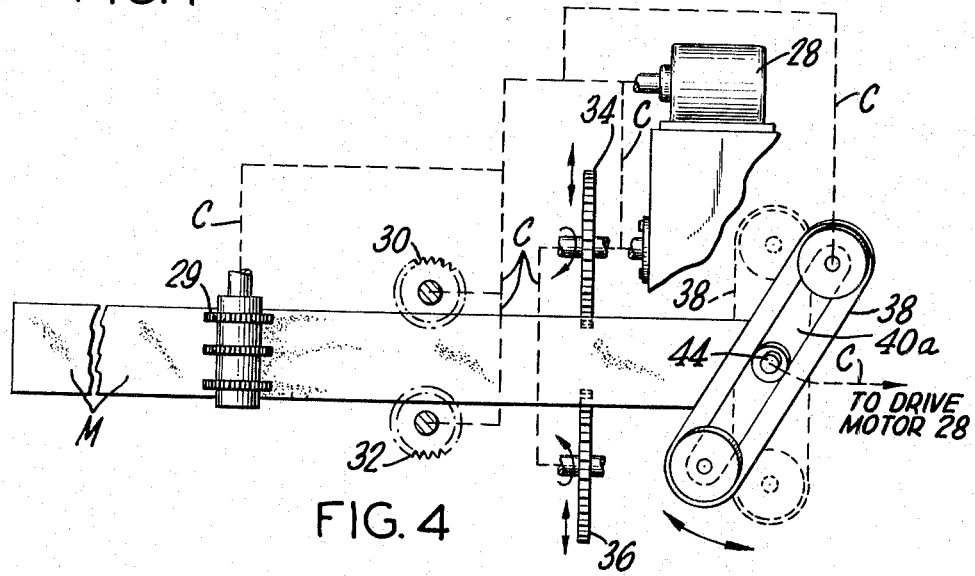
FIG. 4 is a side elevational view schematically showing the components of the present invention.
Figure 5:
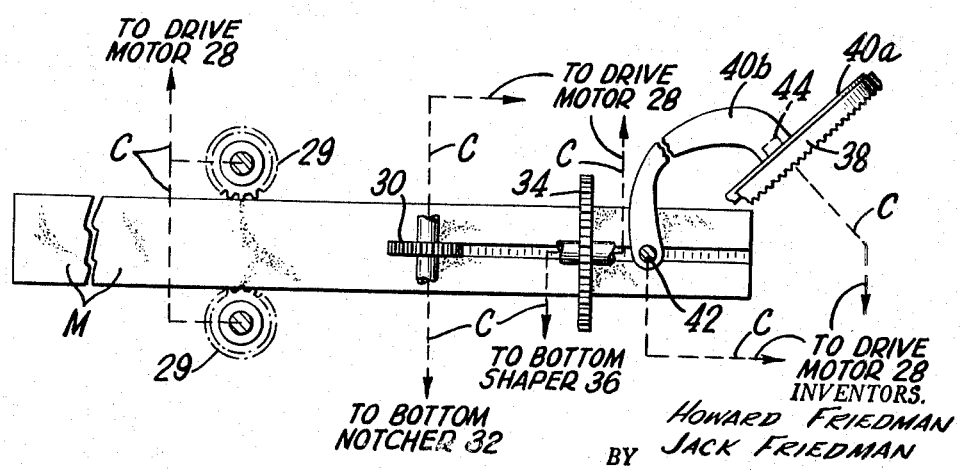
FIG. 5 is a plan view schematically showing the components of the present invention.

FIG. 4 and FIG. 5, in combination, schematically illustrate the method and apparatus of the present invention. It should be understood that the order of operations shown herein may be changed without departing from the spirit of the invention.

Foamed polyurethane bar stock M which may have cross sectional dimensions of 4 inches by 4 inches, is moved parallel to its own longitudinal axis by motor 28. Drive rollers 29, which are disposed on either side of bar M and in frictional, rolling engagement with the sides thereof, are suitably journaled in the machine frame and are connected to motor 28 by coupling means C, such as pulleys and belts, gearing chains, and sprockets, etc. These components are well known and may readily be chosen by a competent designer to fulfill particular requirements. For this reason, they are shown schematically in the drawing.

Notch cutting wheels 30 and 32, rotatably journaled in the machine frame, are also driven by motor 28 through coupling means C. Cutting wheels 30 and 32 are disposed above and below bar stock M to machine longitudinal and parallel notches 24 and 26, respectively. Means to adjust the depth of cut will be described in connection with subsequent figures.

Concave upper surface 14 and concave lower edge 16 are machined by upper and lower shaping wheels 34 and 36, respectively. The shaping wheels are rotatably journaled in the machine frame and are also driven by motor 28 through coupling means C. As may best be seen in FIG. 5, the rotational axis of wheels 34 and 36 are parallel the longitudinal axis or direction of linear movement of bar stock M. Means to vary the depth of cut of the shaping wheels will be discussed more fully hereinafter.

Pivotal and tiltable band saw 38, driven by motor 28 through coupling means C, is arranged to machine concave and convex surfaces 20 and 22 on alternate transverse passes through bar stock M. Band saw 38, which is mounted on brackets 40a and 40b, is arranged to pivot around shaft 42 and be tilted about the axis of shaft 44. Both of the aforementioned shafts are suitably journaled in the machine frame.

The successive cuts of the band saw are shown schematically in FIG. 6 and FIG. 7. By way of example, the band saw will make a transverse, arcuate pass through the bar stock when it is in vertical position, shown in dotted outline in FIG. 4. This will produce the vertical, arcuate surfaces VA shown on the right side of pad I, between pads II and III and on the lift side of pad IV.

The band saw returns to its starting position shown in FIG. 5, is tilted to the position shown in full lines in FIG. 4, and then makes another transverse, arcuate pass through the bar stock. In this position, the sloping, arcuate surfaces SA between pads I and II and between pads III and IV are produced as shown schematically in FIG. 6 and FIG. 7.

Conventional timing and switching means are provided in combination with drive motor and coupling means to suitably time the arcuate travel of band saw 38 and to selectively tilt the band saw back and forth between the vertical plane and the sloping plane shown in FIG. 4. Suitably shaped cams may be employed for timing the motions.

Referring now to FIG. 8, means are diagramatically shown for varying the depth of cut of shaping wheels 34 and 36. For convenience of description and illustration, various coupling means are shown as belts and pulleys, all of which are driven by motor 28. Double pulley 50 is rigidly mounted on shaft 52 which drives upper shaping wheel 34. Pulley 50 is driven by belt 54 which is trained about pulley 56 secured to the shaft of drive motor 28. Link 58 is also loosely mounted on shaft 52 at one of its ends. At its other end, link 58 is provided with flanges 60 which straddle track 62 fixed to the machine frame by screws 64. Threaded stud 66 passes through slot 68 formed in the flanged end of link 58 so that a measure of vertical movement is permitted link 58. Of course, shaft 52 is similarly movable vertically in the machine frame. Pulley 70, rotatably journaled in the machine frame and permitted some degree of horizontal movement, is included to take up any slack in belt 54 when shaping wheel 34 is moved.

Similarly, shaping wheel 36 is vertically adjustable. Pulley 72 is rigidly secured to shaft 74 which drives shaping wheel 36 by means of belt 76 trained about the second groove of pulley 50. Link 78 is also loosely mounted on shaft 74 at one of its ends. At its other end, link 78 is provided with flanges 80 which straddle track 62. Threaded stud 82 passes through slot 84 formed in the flanged end of link 58 so that a measured vertical movement is permitted link 78. Shaft 74 is vertically movable in the machine frame, as was shaft 52. Pulley 86, rotatably mounted on fixed track 62, is provided to assure that bar stock M will clear belt 76; and pulley 88, rotatably mounted and horizontally movable in the machine frame, is provided to take up any slack in belt 76 resulting from the vertical adjustment of shaping wheel 36.

FIG. 9 schematically illustrates vertical adjustment means for upper and lower notch cutting wheels 30 and 32, respectively. Upper wheel 30 is fixed to upper transverse shaft 90, rotatably mounted and vertically movable in the machine frame.

Rotary motion is also imparted to lower transverse shaft 98 by means of pulley 100 fixed to shaft 90, pulley 102 securely mounted on shaft 98, and belt 104 trained about both of the aforementioned pulleys. Shaft 98, like shaft 90, is rotatably journaled and vertically movable in the machine frame. The opposite end of shaft 98 terminates in a second, lower guide member 106 vertically slidable in fixed track 96. Pulley 108, rotatably journaled in the machine frame and horizontally movable parallel to longitudinal axis of bar stock M is adapted to take up any slack in belt 104 caused by the vertical adjustment of notching wheels 30 and 32.

FIG. 10 and FIG. 11 illustrate an alternative shaping tool 110 adapted to form upper and lower concave surfaces 14 and 16. The tool is herein shown as being comprised of a plurality of nested, concentric bands having teeth on one edge thereof. Bands 112, 114, 116 and 118 are coaxially positioned with respect to each other so as to machine the concave surface shown in phantom outline as 120. The depth of the concavity may be varied either by axially moving the entire tool as described in connection with the prior embodiment, or the individual bands may be moved axially with respect to each other to form a different outline at their cutting edges.

For smaller, less elaborate installations, it is to be understood that one of the notching wheels and one of the shaping tools may be omitted. In such an embodiment, only one notch and one concave surface would be formed in a single pass. The bar stock would then be removed, turned over 180° and again passed between the feed rollers to form the opposed second notch and second concave surface. Depending upon space limitations or other factors, the band saw may be located at some point remote from the notching and shaping equipment and more than one motor drive may be employed.

The apparatus described hereinabove economically produces foam polyurethane shoulder pads at a high rate of speed. All of the machining is done automatically and sequentially so that no intermediate handling is required from the time the bar stock is fed into the machine until the finished product is produced. A difficult material to handle is expeditiously machined with a minimum of wastage, thus reducing the cost of each shoulder pad.

The inclusion of upper and lower central notches greatly facilitates the assembly of the shoulder pads into a garment. Due to its simplicity and use of standard components, the apparatus requires little maintenance and supervision.

There has been disclosed heretofore the best embodiments of the invention presently contemplated and it is to be understood that various changes and modifications may be made by those skilled in the art without departing from the spirit of the invention.

What is claimed is:

1. A method for producing a shoulder pad having a plurality of nonplanar surfaces from an elongated bar of foamed plastic, said method comprising the steps of:
   (a) longitudinally feeding the bar;
   (b) cutting a groove in the top and bottom surfaces of the bar parallel to and concurrently with the longitudinal feeding of the bar;
   (c) cutting a concave surface in the top and bottom surfaces of the bar transverse to and concurrently with the longitudinal feeding of the bar;
   (d) cutting a convex face on the leading end of the longitudinally moving bar transverse the movement of the bar; and
   (e) cutting a concave face on the leading end of the longitudinally moving bar transverse the movement of the bar, said convex face cutting and said concave face cutting steps being continuously and alternately performed.

2. A method for producing a shoulder pad having a plurality of nonplanar surfaces from an elongated bar of foamed plastic, said method comprising the steps of:
   (a) longitudinally feeding the bar;
   (b) cutting a groove in the top surface of the bar parallel to and concurrently with the longitudinal feeding of the bar;
   (c) cutting a concave surface in the top surface of the bar transverse to and concurrently with the longitudinal feeding of the bar;
   (d) rotating the bar stock 180° about the longitudinal center line thereof;
   (e) longitudinally feeding the bar a second time;
   (f) cutting a groove in the bottom surface of the bar parallel to and concurrently with the longitudinal feeding of the bar;
   (g) cutting a concave surface in the bottom surface of the bar transverse to and concurrently with the longitudinal feeding of the bar;
   (h) cutting a convex face on the leading end of the longitudinally moving bar transverse the movement of the bar; and
   (i) cutting a concave face on the leading end of the longitudinally moving bar transverse the movement of the bar, said convex face cutting and said concave face cutting steps being alternately performed.

3. A machine for forming a nonplanar shoulder pad from an elongated bar of foamed plastic, said apparatus comprising, in combination:
   (a) a drive motor;
   (b) roller means rotatably journaled in said machine and disposed on two opposed sides of the bar in frictional engagement therewith, said roller means being driven by said motor whereby the bar is longitudinally advanced;
   (c) a pair of rotatable notch cutting wheels journaled in said machine and disposed above and below the bar, said notch cutting wheels being driven by said motor whereby a pair of grooves are cut in the upper and lower faces of the bar, the grooves being parallel to each other and parallel to the direction of bar movement;
   (d) a pair of shaping tools journaled in said machine and disposed above and below the bar, said shaping tools being driven by said motor in a plane transverse the longitudinal movement of the bar whereby concave planes are formed on the upper and lower surfaces of the bar; and
   (e) rotary, end face cutting means pivotably and tiltably journaled in said machine, said cutting means being driven by said motor, said cutting means being arranged for pivotal motion through a path transverse the longitudinal path of the bar, said cutting means alternately tranversing the bar in a plane parallel to the plane of said shaping tools and in a plane at an angle thereto whereby a concave and convex surface, respectively, are formed on the shoulder pad.

4. The apparatus of claim 3 wherein said shaping tools are each in the form of a disc.

5. The apparatus of claim 3 wherein said shaping tools are each comprised of a plurality of nesting, concentric rings, each having cutting teeth on one edge thereof, said cutting teeth being staggered along the axis common thereto.

6. The apparatus of claim 3 including adjustment means to vary the depth of cut of said notch cutting wheels and said shaping tools.

7. A machine for forming a nonplanar shoulder pad from an elongated bar of foamed plastic, said apparatus comprising, in combination:
   (a) a drive motor;
   (b) roller means rotatably journaled in said machine and disposed on two opposed sides of the bar in frictional engagement therewith, said roller means being driven by said motor whereby the bar is longitudinally advanced;
   (c) a rotatable notch cutting wheel journaled in said machine and disposed in cutting relationship to one longitudinal face of the bar stock, said notch cutting wheel being driven by said motor whereby a groove is cut in the face of the bar that is in juxtaposition to said cutting wheel, the groove being parallel to the direction of bar movement;
   (d) a shaping tool journaled in said machine and disposed in cutting relationship to the same longitudinal face of the bar as said cutting wheel, said shaping tool being driven by said motor in a plane transverse the longitudinal movement of the bar whereby a concave plane is formed on the same longitudinal face of the bar as the aforementioned groove; and
   (e) rotary, end face cutting means pivotably and tiltably journaled in said machine, said cutting means being driven by said motor, said cutting means being arranged for pivotal motion through a path transverse the longitudinal path of the bar, said cutting means alternately traversing the bar in a plane parallel to the plane of said shaping tool and in a plane at an angle thereto whereby a concave and convex surface, respectively, are formed on the shoulder pad.

8. The apparatus of claim 7 wherein said shaping tool is in the form of a disc.

9. The apparatus of claim 7 wherein said shaping tool is comprised of a plurality of nesting, concentric rings, each having cutting teeth on one edge thereof, said cutting teeth being staggered along the axis common thereto.

10. The apparatus of claim 7 including adjustment means to vary the depth of cut of said notch cutting wheel and said shaping tool.

11. A method for simultaneously machining similar arcuate surfaces in opposed planes of a pair of adjacent shoulder pads machined from an elongated bar of foam plastic comprising the steps of:
   (a) longitudinally feeding the bar to a cutting station; and
   (b) cutting a concave surface in the top and bottom surfaces of the bar transverse to and concurrently with the longitudinal feeding of the bar whereby subsequent transverse cutting of the bar will produce back-to-back shoulder pads arranged with the top plane of one pad adjacent the bottom plane of the next succeeding shoulder pad.

12. A method for machining similar arcuate surfaces in opposed planes of a pair of adjacent shoulder pads machined from an elongated bar of foam plastic comprising the steps of:
(a) longitudinally feeding the bar to a cutting station;
(b) cutting a concave surface in the top plane of the bar transverse to and concurrently with the longitudinal feeding of the bar;
(c) rotating the bar stock 180° about the longitudinal center line thereof to thereby reorient the bar;
(d) longitudinally feeding the bar a second time to the cutting station; and
(e) cutting a concave surface in the top plane of the reoriented bar transverse to and concurrently with the longitudinal second feeding of the bar whereby subsequent transverse cutting of the bar will produce back-to-back shoulder pads arranged with the top plane of one pad adjacent the bottom plane of the next succeeding shoulder pad.

13. A machine for forming a nonplanar shoulder pad from an elongated bar of foam plastic comprising, in combination with rotatable cutting means arranged for alternate pivotal motion through a path transverse the longitudinal path of the bar in a first plane perpendicular to the path of the bar and in a second plane at an angle to the path of the bar:
(a) a drive motor;
(b) feed means disposed on two opposed sides of the bar in frictional engagement therewith, said feed means being driven by said motor whereby the bar is longitudinally advanced; and
(c) a pair of shaping tools journaled in said machine and disposed above and below the bar, said shaping tools being driven by said motor in a plane transverse the longitudinal movement of the bar whereby concave planes are formed on the upper and lower surfaces of the bar.

14. The apparatus of claim 13 wherein said shaping tools are each in the form of a disc.

15. The apparatus of claim 13 wherein said shaping tools are each comprised of a plurality of nesting concentric rings, each having cutting teeth on one edge thereof, said cutting teeth being staggered along the axis common thereto.

16. A machine for forming a nonplanar shoulder pad from an elongated bar of foam plastic comprising, in combination with rotatable cutting means arranged for alternate pivotal motion through a first path transverse the longitudinal path of the bar in a second plane perpendicular to the path of the bar and in a plane at an angle to the path of the bar:
(a) a drive motor;
(b) feed means disposed on two opposed sides of the bar in frictional engagement therewith, said feed means being driven by said motor whereby the bar is longitudinally advanced; and
(c) a shaping tool journaled in said machine and disposed in cutting relationship to the same longitudinal face of the bar as said cutting wheel, said shaping tool being driven by said motor in a plane transverse the longitudinal movement of the bar whereby a concave plane is formed on the same longitudinal face of the bar as the aforementioned groove.

17. The apparatus of claim 16 wherein said shaping tool is in the form of a disc.

18. The apparatus of claim 16 wherein said shaping tool is comprised of a plurality of nesting concentric rings, each having cutting teeth on one edge thereof, said cutting teeth being staggered along the axis common thereto.

References Cited by the Examiner

UNITED STATES PATENTS

| | | | |
|---|---|---|---|
| 833,382 | 10/1906 | Greif | 83—5 |
| 2,654,096 | 10/1953 | Riley | 2—268 |
| 2,858,545 | 11/1958 | Silverman | 2—268 |
| 3,156,147 | 11/1964 | Linn et al. | 83—5 |

WILLIAM W. DYER, JR., *Primary Examiner.*

JORDAN FRANKLIN, *Examiner.*

J. R. BOLER, G. A. DOST, *Assistant Examiners.*